Oct. 20, 1931.  H. L. INGERSOLL  1,827,817
ELECTRIC LOCOMOTIVE
Filed April 12, 1929  3 Sheets-Sheet 1
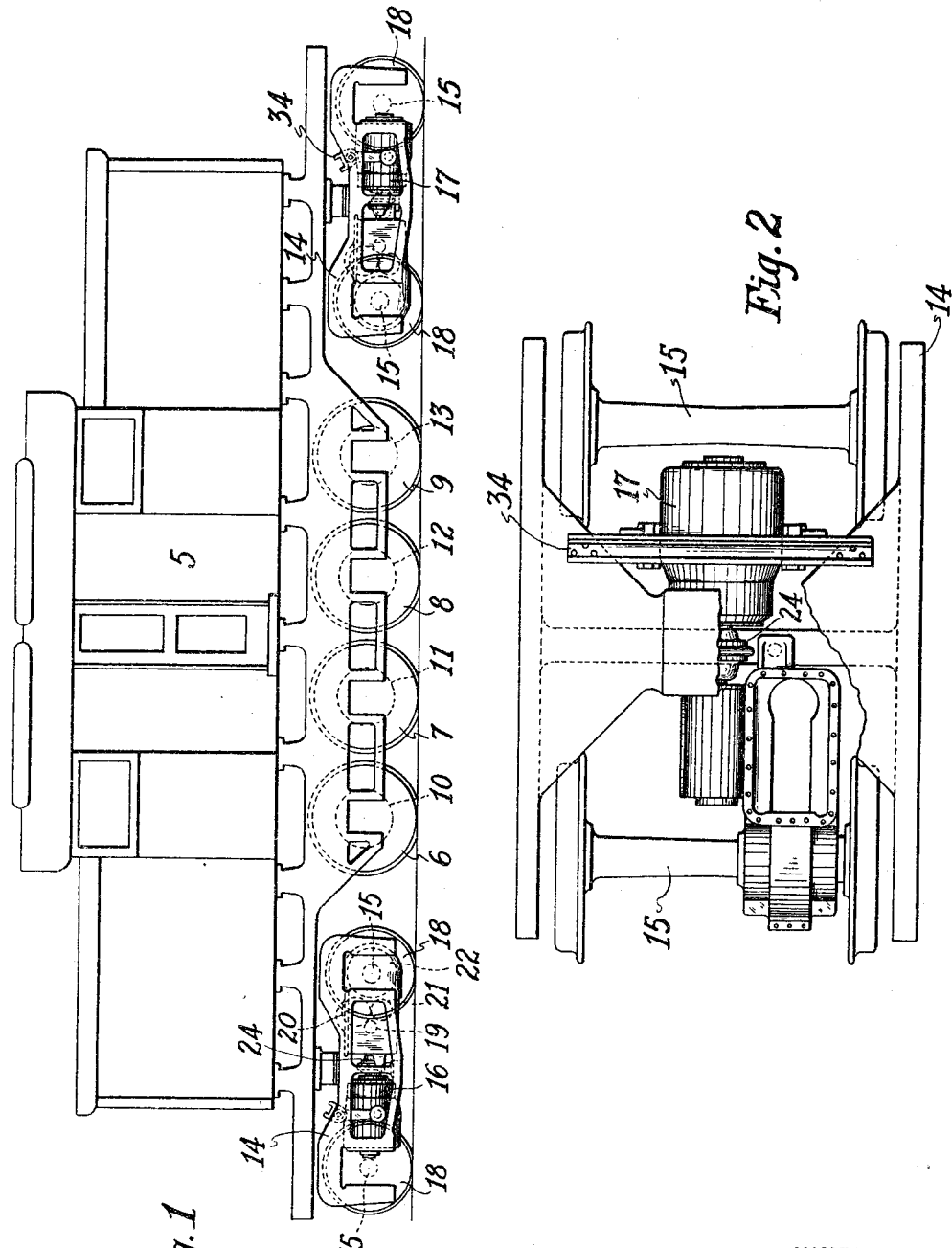
INVENTOR
Howard L. Ingersoll
BY
Synnestvedt & Lechner
ATTORNEYS Oct. 20, 1931. H. L. INGERSOLL 1,827,817
ELECTRIC LOCOMOTIVE
Filed April 12, 1929 3 Sheets-Sheet 2

INVENTOR
Howard L. Ingersoll
BY
Annestredt Lechner
ATTORNEYS

Oct. 20, 1931.   H. L. INGERSOLL   1,827,817
ELECTRIC LOCOMOTIVE
Filed April 12, 1929   3 Sheets-Sheet 3

INVENTOR
Howard L. Ingersoll
BY
ATTORNEYS

Patented Oct. 20, 1931

1,827,817

UNITED STATES PATENT OFFICE

HOWARD L. INGERSOLL, OF STAMFORD, CONNECTICUT

ELECTRIC LOCOMOTIVE

Application filed April 12, 1929. Serial No. 354,458.

This invention relates to electric locomotives, and it has for its primary object the provision of such locomotive which can be operated more efficiently and economically, and one which can start greater loads and handle heavier trains.

It is well known that a given electric motor will operate at its greatest efficiency in a certain range of speeds, and that if this speed be substantially lower or greater, that the efficiency is materially reduced, and with this principle in mind it is an object of my invention to provide an electric locomotive which has a main motor or a series of main motors designed to have their greatest efficiency at comparatively high speeds, say in the neighborhood of thirty to sixty miles an hour—and to equip such locomotive with one or more auxiliary or booster motors which have their greatest efficiency in a much slower range of speeds, and which will develop a very strong starting torque. I further provide for entirely disentraining or disengaging said booster motors so as to save the wear and tear on their connecting parts when their services are not needed and to relieve the main motors of the load which would otherwise be necessary to drive them at such times.

In connection with the latter object, I also provide uni-directional booster motors which are normally entirely disentrained from the axle or wheels which they drive, and which can be entrained for either forward or backward motion of the locomotive. I also prefer and provide wheels for the booster motors to drive which are of a diameter smaller than the diameter of the wheels driven by the main motors.

It is a further object of my invention to provide a unified controlling mechanism for all of the motors so that the engineer will not be overburdened with separately actuated devices, since it is extremely important not to complicate the operation of a locomotive to any extent greater than necessary in order to provide for the greatest factor of safety. I, therefore, provide, a controlling mechanism which is substantially automatic in its operation and under the direct control of the usual or customary controlling mechanism for an electric locomotive, the only thing which is left to the discretion of the engineer in my improved locomotive being the possibility of electing whether or not the booster motor should go into operation at all. Therefore, if the engineer elects to utilize the booster motor or motors, he simply turns a switch which cuts them in and thereafter manipulates his main controls in the customary manner, the booster motors being automatically entrained to start the locomotive and aid in its operation at comparatively low speeds and automatically cut out and disentrain when substantially higher speeds are obtained. Specifically I provide a normally open switch in the circuits of the booster motors which is closed by a solenoid in the circuit of the main motors so that the booster motors will be placed into operation when the load on the main motors exceeds a predetermined standard and automatically cut out of operation when the load on the main motors falls below said standard.

How the foregoing, together with such other objects as may appear hereinafter, or are incident to my invention, are obtained is illustrated in a preferred form in the accompanying drawings, wherein—

Fig. 1 is a side elevation of an electric locomotive embodying my improvements.

Fig. 2 is a plan view of a truck with smaller wheels to which my improved booster motor is applied.

Figure 3:
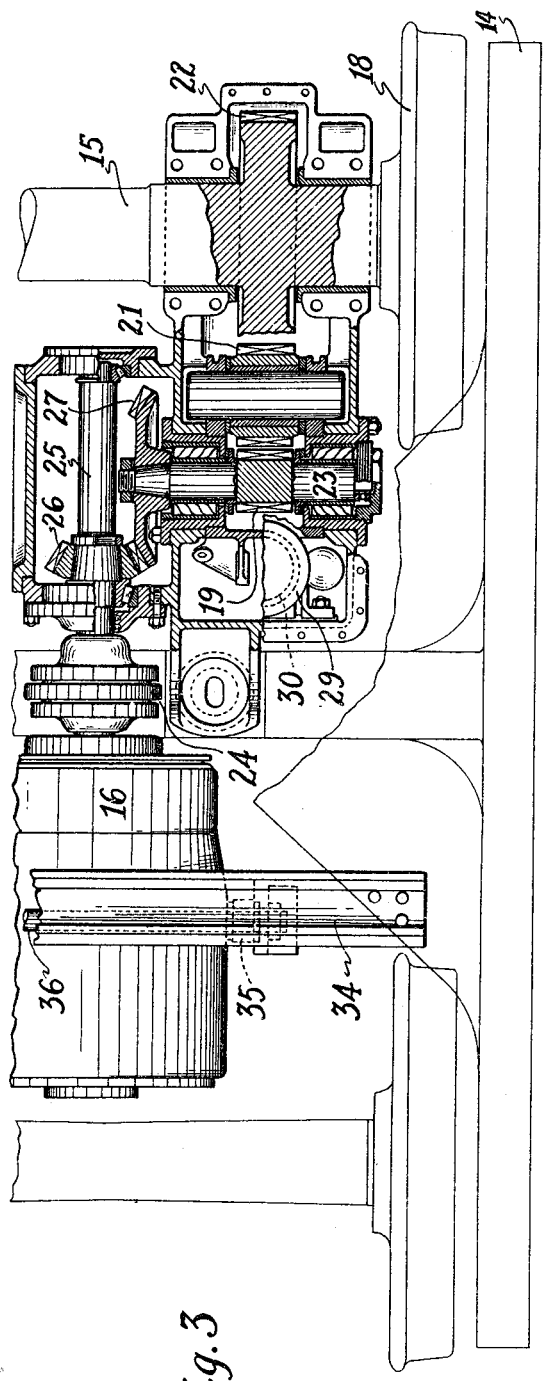
Fig. 3 is a half view similar to that of Fig. 2, but illustrating in section certain parts of the entraining mechanism for the booster.

In the preferred embodiment of my invention illustrated in the accompanying drawings the electric locomotive 5 is provided with four main driving axles having the main driving wheels 6, 7, 8 and 9, the axle of each pair of such wheels being provided with the customary main driving motors 10, 11, 12 and 13.

At each end of the locomotive is a swiveling truck 14 having a pair of axles 15. There is a motor 16 for driving the inner axle of one of said trucks 14 and a motor 17 for driving the inner axle of the other of said trucks 14.

Figure 4:
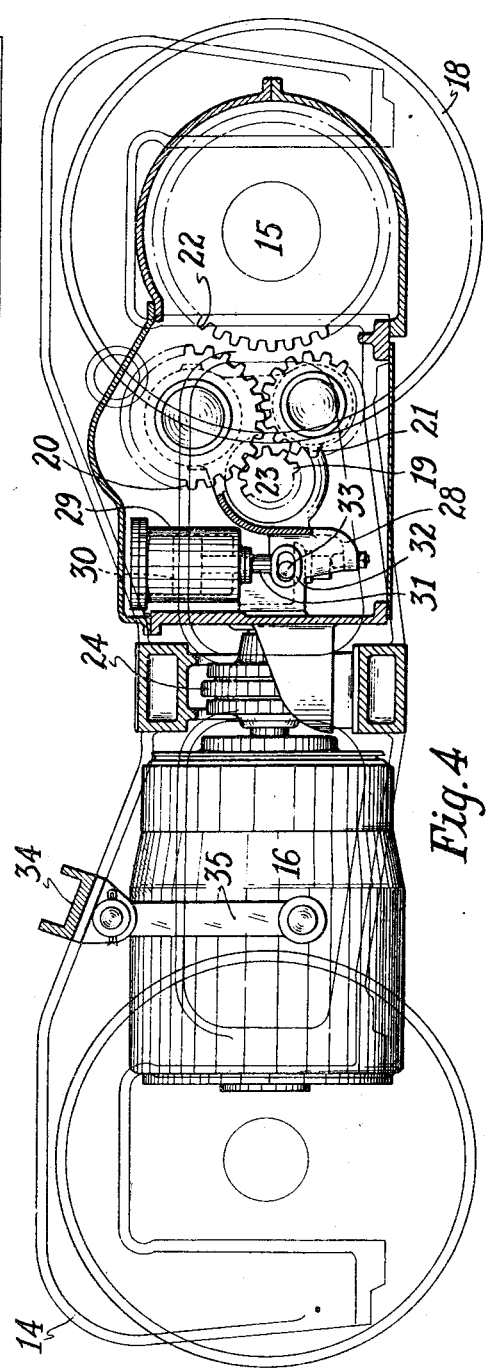
Fig. 4 is a partial side elevation and longitudinal vertical section through the structure illustrated in Fig. 3.

Figs. 3 and 4 illustrate specifically the left hand booster truck construction, and in the following description reference will be made particularly to this left hand truck, but it should be understood that the right hand truck is substantially identical with the left hand truck, except that the motor 17 and all of the parts associated therewith are arranged in reversed relation.

As will be seen from Fig. 1, the wheels 18 on the trucks 14 are smaller in diameter than the main wheels of the locomotive, and the motor 16 is adapted to drive the inner axle 15 of its truck 14 through the medium of the driving pinion 19, the intermediate idler gears 20 and 21 and the axle gear 22. The axle gear 22, of course, is fixed to the axle 15 and the driving pinion 19 is mounted upon the transverse stub shaft 23 which is driven by the motor 16 through the flexible connection 24, the driving shaft 25 and the beveled gears 26 and 27. However, I wish it to be understood that this particular form of connection between the motor 16 and the driving pinion 19 is by no means essential, as any other arrangement might be adopted, or the motor 16 might be disposed to drive the pinion 19 directly.

The intermediate or idler gears 20 and 21 are mounted upon a rocking member 28 which is arranged to swing upon the shaft 23 as a fulcrum. The gear 20 is always in mesh with the driving pinion 23 and the gear 21 is always in mesh with the gear 20; and in inoperative position both gears 20 and 21 are out of mesh with the axle gear 22, as shown in Fig. 4.

Inasmuch as the motor 16 (and also the motor 17) is a uni-directional motor, it will be seen that the axle 15 will be rotated in one direction when the gear 20 is meshed with the gear 22 and in the reverse direction when the gear 21 is meshed with the gear 22.

Meshing of the gears 20 and 21 is effected by means of a fluid pressure actuated motor device 29 in which reciprocates a piston 30 connected by means of the rod 31, eye 32 and pin 33 to the rocking member 28, all as illustrated most clearly in Fig. 4.

When pressure is admitted to the upper side of the piston 30, the rocking member 28 will be rotated in a counterclockwise direction and the gear 21 will be thrown into mesh with the gear 22, but when pressure is admitted to the lower side of the piston 30, the rocking member 28 will be rotated in a clockwise direction and the gear 20 will be thrown into mesh with the gear 22. In the latter instance, the gear 21 is so disposed as not to interfere with the driving pinion 19. A similar arrangement of gears for a steam actuated booster motor is illustrated in the patent to Roberts and Forker, No. 1,686,710, issued on October 9, 1928, to which reference can be made if so desired. The particular gearing arrangement illustrated forms no part of the present invention, but it is illustrated and described to this extent in order to make the disclosure completely operative.

The motors 16 and 17 are supported from the framework of the trucks 14 by means of the beam or channel 34, the depending links 35 and the transverse rod 36.

Figure 5:
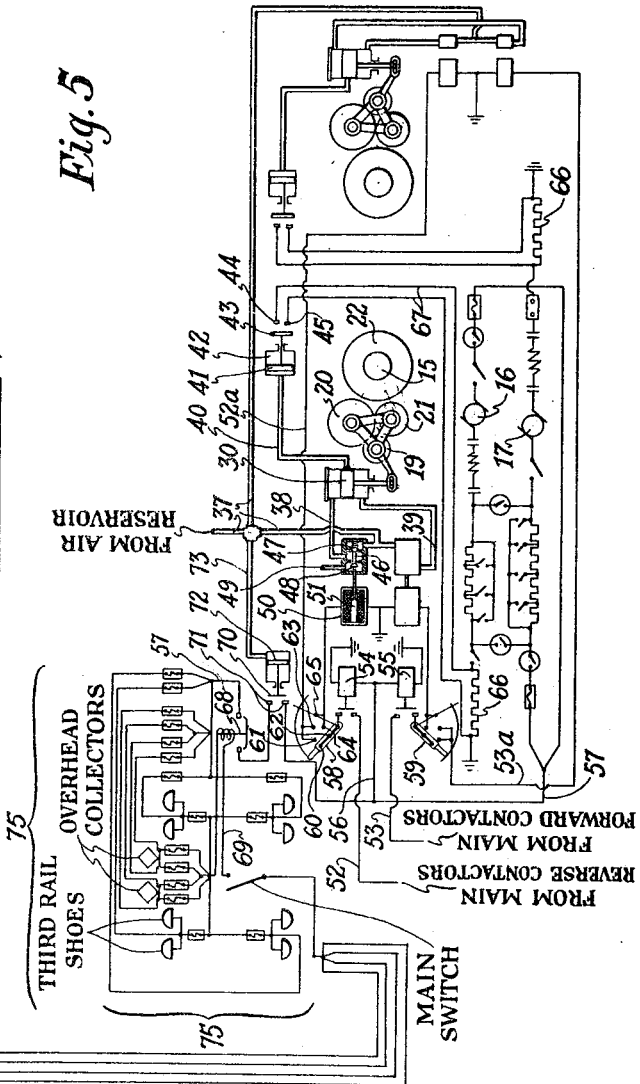
Fig. 5 is a diagrammatical layout of a controlling mechanism suitable for use with my invention.

By referring to Fig. 5, it will be seen that the fluid pressure for actuating the piston 30 of the motor device 29 comes in through the pipe 37 which is connected to the air reservoir (not shown), or to any other suitable source of fluid pressure. The pipe 37 divides into two branches 38 and 39, the branch 38 leading to the upper side of the piston 30 and the branch 39 to the lower side. Substantially in the center of the cylinder in which the piston 30 reciprocates is an air discharge pipe 40 which leads to the face of the piston 41 in the cylinder 42, the piston 41 serving to move the switch 43 to complete the circuit between the contacts 44 and 45 when such becomes necessary in accordance with the description to follow.

The flow of the pressure fluid through the pipes 38 and 39 is controlled by means of an electrically actuated valve device 46. When the valve device 46 is moved to the left, the portion 47 is seated and closes off communication between the pipe 37 and the pipe 38. In this position the pressure above the piston 30 can be exhausted through the pipe 38, the discharge taking place past the portion 48 of the valve device 46 and out through the exhaust port 49.

The valve 47 is normally held in closed position, either by the pressure of the fluid or by means of suitable spring devices not shown.

In order to open the valve 47 and close the valve 48, it is necessary to move the valve device 46 to the right, and I accomplish this electrically by means of the solenoid 50, the core 51 of which is connected to the valve device 46. When the current is applied to the solenoid 50 the core 51 is arranged to be moved to the right in order to close the valve 48 and open the valve 47 and thereby admit the pressure fluid from the pipe 37 to the pipe 38 which leads to the upper side of the piston 30. As previously discribed, this, of course, will mesh the gear 21 with the axle gear 22.

There is an exactly similar valve and solenoid mechanism 46 to 51 inclusive for controlling the branch pipe 39 which leads to the under side of the piston 30. When this other mechanism comes into operation, the piston 30 is moved upwardly and the gear 20 is brought into mesh with the gear 22 to drive the axle 15 in the other direction.

The current for operating the solenoids 50 comes in through the wires 52 and 53, the wire 52 coming from the main contactor of the controller for, let us say, reverse motion of the locomotive, and the wire 53 coming from the main contactor of the controller for forward motion of the locomotive. The circuit through the wire 52 is normally broken by the solenoid switch mechanism 54 and through the wire 53 by the solenoid switch mechanism 55.

The solenoids 54 and 55 are operated by a relay circuit 56 which taps into the main line 57 leading from the controller to the booster motors 16 and 17. In other words, when the booster motors come into operation the circuits for the solenoid switches 54 and 55 are completed so that the lines 52 and 53 will be complete.

There is a hand switch 58 and another hand switch 59 in the circuits 52 and 53, respectively, by throwing which the engineer can utilize either one or the other, or both, of the booster motors as may be desired.

For example, if the switch 58 is moved so that contact 60 closes the circuit through contact 61, the booster motor 17 only, at the right hand end of the locomotive will be brought into operation. But if the switch 58 is thrown to the middle position so that the circuit is completed through contacts 60 and 62, with the contacts 63 and 64, both of the booster motors 16 and 17 will be brought into operation. Finally if the switch 58 is thrown to its extreme right hand position, the circuit to the left hand booster motor only will be completed through the contact 60 and the contact 65.

A similar arrangement to that which has just been described is possible with the switch 59. Furthermore, the switch 59 may, if so desired, be interlocked with the switch 58 so that motion of one will similarly move the other, the direction in which the booster motors 16 and 17 will function depending upon the direction of current flow to the main motors 10, 11, 12 and 13. If the main motors are being operated in one direction, the current will come through the circuit 52 and no current will be coming through the circuit 53, but if the locomotive is being operated in the other direction, the current will come in through the circuit 53 and no current will be coming in through the circuit 52. When the locomotive is traveling in one direction the circuits for both motors will be established through the wires 52 and 52a, and when the locomotive is moving in the opposite direction, through the wires 53 and 53a.

In order to prevent clashing of the gears 20 and 21 with the gear 22 during an entrainment operation, it is necessary for the gears 20 and 21 to be revolving at a comparatively slow speed, and I accomplish this by means of the following mechanism. I place in the circuit 57 leading to the booster motors resistances 66 which are of a value sufficient to cause only slow rotation of the driving pinion 19. As the piston 30 is moved the gears 20 and 21 will be rotated, therefore, at a slow rate of speed until after meshing has been completed, whereupon the piston 30 will uncover the pipe 40 leading to the piston 41 already described. This piston 41 will then be moved to close the circuit between the contacts 44 and 45, whereupon the wire 67 will short circuit the resistance 66 and permit the booster motors to function as a driving factor.

Inasmuch as the booster motors 16 and 17 are intended to help propel the locomotive only in starting or at comparatively low speeds, I make them dependent upon the load on the main motors 10—13. This is accomplished by introducing the solenoid switch 68 in the supply line 57 for the booster motors. The coil of the solenoid switch 68 is directly responsive to the load on the main motors passing through the line 69, so that when this load is above a predetermined point, as it would be in starting or in pulling the train up a heavy grade, the switch 68 will be closed and the booster motors put into operation, but when the locomotive is well started and is running at a speed, say, in the neighborhood of thirty miles per hour or over, the load on the main motors will be insufficient to keep the switch 68 closed, whereupon the booster motors will be automatically thrown out of operation.

In order to protect the booster motors and their entraining mechanism in the event of an air failure, I also introduce into the line 57 a second switch 70 which is normally adapted to be held in closed position against the contacts 71 by means of the fluid actuated piston 72, connection to the source of fluid supply being made through the pipe 73.

In the description of the booster motor controlling mechanism I have, in most instances, limited the discussion to the booster motor 16, but it will be understood that the booster motor 17 is controlled in exactly the same way by parts which are simply duplicates of the parts so far described, so that it will be unnecessary to go into more full discussion of the operation of the other booster motor 17.

A conventional controlling system for the main motors 10—13 is illustrated in Fig. 5 by that portion of the apparatus referred to by the reference character 74, and a typical collecting system is illustrated by that portion of Fig. 5 referred to by the character 75. This portion of the apparatus, however, forms no part of the present invention in and of itself; therefore it will not be described in detail. The drawings, however, will be clearly understood by those skilled in the art.

As has been pointed out, the two booster motors 16 and 17 are arranged in opposite directions, so that in order to apply their force in driving the locomotive in the same direction, it is necessary to entrain one motor through the gear 20, while the other motor is entrained through the gear 21 and vice versa. This, again, is a detail which forms no part of the present invention and is merely mentioned in order to avoid possible confusion.

An electric locomotive equipped in this way can be much more efficiently and economically operated, for the reason that the main motors 10—13 can be so constructed as to perform their most efficient service at average running speeds, say between thirty and sixty miles an hour. At such times the booster motors 16 and 17 are cut out of operation, and, indeed, entirely disconnected from the axles which they drive, so that all unnecessary wear on the connecting parts is eliminated and the main motors are not called upon to drive the load which would otherwise exist were the booster motors left in entrainment with their axles. Furthermore, very powerful motors can be applied to the axles 15 and a very large starting torque developed by virtue of the fact that the wheels 18 are of smaller diameter than the main wheels 6—9.

Another advantage is incident to the fact that the booster motors can be more cheaply constructed, since they are of smaller size than the main motors, and yet the power necessary to start a heavy train is amply provided for. Once the train has been started the main motors are sufficient to take the load and the booster motors (at this time not capable of such efficient operation as the main motors) are cut out and completely disengaged from their axles.

What I claim is:—

1. In an electric locomotive, the combination of a main motor, a booster motor, and electrically actuated means for automatically completing the circuit of the booster motor when the consumption of current by the main motor exceeds a predetermined standard.

2. In an electric locomotive having a main controller, the combination of an axle, a booster motor, electrically actuated means for automatically completing the circuit of the booster motor when the load through said controller exceeds a predetermined standard, a normally disentrained and reversible connection between axle and motor, electrically controlled means for effecting connection between axle and motor, a circuit closed by the main controller when the locomotive is moving forwardly adapted to actuate said electrically controlled means to connect the booster motor for forward driving, upon completion of said booster circuit and a circuit closed by the main controller when the locomotive is moving backwardly adapted to actuate said electrically controlled means to connect the booster motor for backward driving upon completion of said booster circuit.

3. In an electric locomotive, the combination of a main driving wheel, a main motor for said main driving wheel, an auxiliary driving wheel, an auxiliary motor for driving said auxiliary wheel, a driving pinion connected to the auxiliary motor, a driven gear connected to the auxiliary wheel, shiftable gears adapted to cooperate with said pinion and said driven gear to effect entrainment of the auxiliary motor for either forward or backward movement of the locomotive, a high resistance circuit for causing slow operation of said motor during an entraining operation, means for short circuiting said resistance after entrainment is completed, and means controlled by the direction of operation of said main motor for causing correlative entrainment of said booster motor.

4. In an electric locomotive, the combination of a main driving wheel, a main motor for said main driving wheel, an auxiliary driving wheel, a normally disentrained booster motor for said auxiliary wheel, means for entraining the booster motor with its wheel for either forward or backward running of the locomotive, a high resistance circuit for causing slow operation of said booster motor during an entraining operation, means for short circuiting said resistance after entrainment is completed, and means controlled by the direction of operation of said main motor for causing correlative entrainment of said booster motor.

5. In an electric locomotive, the combination of a main driving wheel, an auxiliary driving wheel of smaller diameter than the main driving wheel, a motor for driving the main wheel, a normally disentrained booster motor for driving the auxiliary wheel, and means for entraining and operating said booster motor when the consumption of current by the main motor exceeds a predetermined standard.

6. In an electric locomotive, the combination of a main driving wheel, an auxiliary driving wheel of smaller diameter than the main driving wheel, a motor for driving the main wheel, a normally disentrained booster motor for driving the auxiliary wheel, means for entraining and operating said booster motor to aid in starting and driving the locomotive at low speed, and means for disentraining and stopping said booster motor after the locomotive gets under way.

7. In an electric locomotive, the combination of a main driving wheel, a main motor for said main driving wheel, an auxiliary driving wheel, a normally disentrained booster motor for said auxiliary wheel, means for entraining the booster motor with its wheel for either forward or backward running of the locomotive, and means controlled by the direction of operation of said main motor for causing correlative entrainment of said booster motor.

8. In an electric locomotive, the combination of a main motor, a normally disentrained booster motor, and electrically actuated means for automatically entraining said booster motor when the load on the main motor exceeds a predetermined standard.

9. In an electric locomotive, the combination of a main motor, a normally disentrained booster motor, means for entraining said booster motor for either forward or backward running of the locomotive, and means controlled by the direction of operation of said main motor for causing correlative entrainment of said booster motor when the load on the main motor exceeds a predetermined standard.

10. In an electric locomotive, the combination of a reversible main motor, a normally idle and disentrained booster motor, means for entraining said booster motor for either forward or backward running of the locomotive, and means controlled by the direction of operation of said main motor for causing correlative entrainment and operation of said booster motor when the load on the main motor exceeds a predetermined standard.

11. In an electric locomotive, the combination of a main motor, a normally disentrained booster motor, fluid pressure actuated means for entraining the booster motor, an electrically operated valve mechanism for controlling the supply of pressure fluid to said actuating means, a normally open switch in the circuit of said electrically operated valve, and means for closing said switch when the load on the main motor exceeds a predetermined standard.

12. In an electric locomotive, the combination of a main motor, a normally disentrained booster motor, fluid pressure actuated means for entraining the booster motor, an electrically operated valve mechanism for controlling the supply of pressure fluid to said actuating means, a normally open switch in the circuit of said electrically operated valve, a second switch in said circuit normally closed by the pressure fluid, and means for closing said first switch when the load on the main motor exceeds a predetermined standard, said second switch being adapted to be opened in the event of a failure in the supply of pressure fluid.

13. In an electric locomotive, the combination of a normally disentrained motor, fluid pressure actuated means for entraining said motor, an electrically operated valve mechanism for controlling the supply of pressure fluid to said actuating means, and a switch in said circuit normally closed by the pressure fluid, said switch being adapted to be opened in the event of a failure in the supply of pressure fluid.

14. In an electric locomotive, the combination of a reversible main motor, a normally disentrained booster motor, means for entraining said booster motor so as to drive the locomotive forwardly, means for entraining said booster motor so as to drive the locomotive backwardly, and electrically actuated means for selecting the requisite entrainment, said means being under the control of the circuits to said main motor so as to insure entrainment of the booster motor which corresponds to the direction of operation of the main motor.

15. In an electric locomotive, the combination of a reversible main motor, a normally disentrained booster motor, means for entraining said booster motor so as to drive the locomotive forwardly, means for entraining said booster motor so as to drive the locomotive backwardly, electrically controlled means for actuating the entraining means, a circuit for said electrically controlled actuating means which effects forward entrainment when the main motor is operating in a forward direction, and a circuit for said electrically controlled actuating means which effects backward entrainment when the main motor is operating in a backward direction.

16. In an electric locomotive, the combination of a main motor, a normally disentrained booster motor, the circuit for which is normally open, means for entraining the booster motor including a radially shiftable gear, and means for shifting said gear to entrain said booster motor and for closing its circuit when the consumption of current by the main motor exceeds a predetermined standard.

In testimony whereof I have hereunto signed my name.

HOWARD L. INGERSOLL.